United States Patent
Albulushi et al.

(10) Patent No.: US 8,001,862 B2
(45) Date of Patent: Aug. 23, 2011

(54) REVERSE DRIVE ASSEMBLY FOR A MOTORCYCLE

(75) Inventors: Jay Albulushi, Jackson, WI (US); Seth Cooley, West Bend, WI (US); Richard G. Dykowski, Waukesha, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 573 days.

(21) Appl. No.: 11/942,903

(22) Filed: Nov. 20, 2007

(65) Prior Publication Data

US 2009/0126522 A1    May 21, 2009

(51) Int. Cl.
*F16H 3/08* (2006.01)
(52) U.S. Cl. .......................................... 74/329; 74/337.5
(58) Field of Classification Search .......................... None
See application file for complete search history.

(56) References Cited

U.S. PATENT DOCUMENTS

| | | | |
|---|---|---|---|
| 1,469,984 A | 10/1923 | Barlough | |
| 3,766,794 A * | 10/1973 | Wilcox | 74/355 |
| 4,523,491 A | 6/1985 | Dittmann, Jr. | |
| 4,583,613 A | 4/1986 | Nakayama | |
| 4,635,506 A | 1/1987 | Imaizumi et al. | |
| 4,658,661 A | 4/1987 | Terashita | |
| 4,754,662 A | 7/1988 | Misawa | |
| 4,763,538 A | 8/1988 | Fujita et al. | |
| 4,827,148 A | 5/1989 | Hirosawa et al. | |
| 4,869,332 A | 9/1989 | Fujita et al. | |
| 4,870,874 A | 10/1989 | Ito | |
| 4,923,028 A | 5/1990 | Yamashita et al. | |
| 4,974,695 A | 12/1990 | Politte | |
| 5,024,113 A | 6/1991 | Ito et al. | |
| 5,069,304 A | 12/1991 | Mann | |
| 6,024,198 A | 2/2000 | Hamby et al. | |
| 6,054,826 A | 4/2000 | Murakami et al. | |
| 6,076,416 A | 6/2000 | Sputhe | |
| 6,267,192 B1 | 7/2001 | Maier et al. | |
| 6,457,374 B1 | 10/2002 | Shen | |

(Continued)

OTHER PUBLICATIONS

Baker Drivetrain, Inc.; Baker Drivetrain Premium Drivetrain Innovations for American Motorcycles, Haslett, MI; http://www.bakerdrivetrain.com/f6r/index.htm, downloaded Mar. 25, 2008.

(Continued)

*Primary Examiner* — Justin Holmes
(74) *Attorney, Agent, or Firm* — Michael Best & Friedrich LLP

(57) ABSTRACT

A reverse drive assembly for a motorcycle that includes a transmission assembly having a main shaft and a counter shaft. The reverse drive assembly includes a first drive member configured to be coupled to an opposite end of the main shaft, a second drive member configured to be coupled to a second end of the counter shaft, and an engagement member operatively positioned between the second drive member and the counter shaft. The engagement member is movable between a first position out of engagement with the second drive member and the counter shaft, and a second position in engagement between the second drive member and the counter shaft to drive the counter shaft in a reverse direction. In some constructions, the engagement member is operatively positioned between the first drive member and the main shaft.

18 Claims, 18 Drawing Sheets

U.S. PATENT DOCUMENTS

| | | |
|---|---|---|
| 6,457,381 B1 | 10/2002 | Nonaka et al. |
| 6,708,579 B2 | 3/2004 | Punko |
| 6,851,329 B2 * | 2/2005 | Chiang .......................... 74/355 |
| 7,017,697 B2 | 3/2006 | Yang |
| 7,059,210 B2 * | 6/2006 | Thiessen et al. ............. 74/337.5 |
| 2007/0022833 A1 * | 2/2007 | Mamba .......................... 74/321 |
| 2007/0062318 A1 * | 3/2007 | Chang .......................... 74/325 |
| 2010/0077884 A1 | 4/2010 | Ono et al. |

OTHER PUBLICATIONS

Baker Drivetrain, Inc.; Baker Drivetrain Premium Drivetrain Innovations for American Motorcycles; Installation Instructions pp. 1-21; appears to be dated Dec. 3, 2007; Haslett, MI.

E-Glide Goodies, Inc., Back-Out with Easel, http://www.eglidegoodies.com/id71.html, Carlsbad, CA.

* cited by examiner

REVERSE DRIVE ASSEMBLY FOR A MOTORCYCLE

BACKGROUND

The present invention relates to a motorcycle. More particularly, the present invention relates to a reverse drive assembly for a motorcycle.

Motorcycles commonly only include transmission assemblies operable to drive the motorcycles in a forward direction. If a user wishes to move the motorcycle in reverse, the user typically either has to walk the motorcycle backwards or dismount and push the motorcycle. However, such a task can be very difficult for smaller users or for a user trying to move a larger, heavier motorcycle (e.g., a trike). In addition, the user may also struggle when trying to move the motorcycle up a hill or over a curb in reverse.

A typical forward-driving transmission assembly 10 for a motorcycle is shown in FIGS. 1 and 2. The illustrated transmission assembly 10 includes a main shaft 14, a counter shaft 18, a set of first gears 22 coupled to the main shaft 14, and a set of second gears 26 coupled to the counter shaft 18. The main shaft 14, the counter shaft 18, and the gears 22, 26 are positioned within a transmission case 30 (FIG. 2) that is coupled to a frame of the motorcycle. The transmission assembly 10 is then coupled to an engine to drive the motorcycle in a forward direction.

The illustrated main shaft 14 includes an input end 34 configured to be rotated by the engine and an opposite end 38 supported by a support plate 42. The first gears 22 are integrally formed on the main shaft 14 to rotate with the main shaft 14. An output gear 46 is positioned around the input end 34 to transmit drive force from the transmission to a rear wheel of the motorcycle. As shown in FIG. 2, a bearing 50 is positioned between the output gear 46 and the main shaft 14 to allow relative rotation between the main shaft 14 and the output gear 46.

The illustrated counter shaft 18 extends parallel to the main shaft 14 and includes a first end 54 adjacent to the input end 34 of the main shaft 14 and a second end 58 opposite the first end 54. Each of the second gears 26 includes a bearing 62 positioned between the counter shaft 18 and the corresponding gear 26 to allow relative rotation between the counter shaft 18 and the gears 26. The second gears 26 are each in constant engagement with a corresponding first gear 22 such that the second gears 26 rotate whenever the main shaft 14 rotates. An output gear 66 is securely mounted near the first end 54 to rotate with the counter shaft 18. The output gear 66 of the counter shaft 18 intermeshes with the output gear 46 of the main shaft 14 to transmit rotation from the counter shaft 18 to the output gear 46 on the main shaft 14.

The illustrated transmission assembly 10 also includes a first dog ring 70 coupled to a first shifter fork 72 and a second dog ring 74 are coupled to a second shifter fork 76. The dog rings 70, 74 are slidably coupled to the counter shaft 18 to transmit rotation from the second gears 26 to the counter shaft 18. When a user selects a gear or shifts gears, the corresponding shifter fork 72, 76 moves the corresponding dog ring 70, 74 into engagement with a corresponding adjacent gear 26 such that the dog ring 70, 74 rotates with the gear 26 and transmits the rotation to the counter shaft 18. As shown in FIG. 1, a shifter drum 78 is coupled to the support plate 42 and to the shifter forks 72, 76 such that rotation of the shifter drum 78 moves the shifter forks 72, 76 to, in turn, move the dog rings 70, 74 when the user shifts gears.

Typically, the transmission assembly 10 also includes a side cover 82 (FIG. 2). The side cover 82 is coupled to the support plate 42 to cover a side opening 86 of the transmission case 30. The side opening 86 provides clearance for the opposite end 38 of the main shaft 14, the second end 58 of the counter shaft 18, and other components of the transmission assembly 10, in addition to providing maintenance access to the transmission assembly 10.

In operation, the engine rotates the main shaft 14, causing the first gears 22 and the second gears 26 to rotate. When the transmission is in neutral, the counter shaft 18 is not rotating and is, therefore, not transmitting rotation to the output gear 66. When a user selects a gear, one of the shifter forks 72, 76 slides the corresponding dog ring 70, 74 into engagement with the selected gear 26 on the counter shaft 18. Rotation is then transmitted from the main shaft 14, through the selected gears 22, 26 to the counter shaft 18 and through the output gear 66 on the counter shaft 18 to the output gear 46 on the main shaft 14. The output gear 46 transmits the rotation to the rear wheel of the motorcycle (e.g., through a chain, belt, or shaft drive) to thereby drive the motorcycle in the forward direction.

SUMMARY

The present invention provides a reverse drive assembly for a motorcycle including a transmission assembly having a transmission case, a main shaft rotatably coupled to the transmission case, a counter shaft rotatably coupled to the transmission case, and a plurality of gears coupled to at least one of the main shaft and the counter shaft. The main shaft has an input end and an opposite end. The input end is configured to be rotatably driven. The counter shaft has a first end adjacent to the input end of the main shaft and a second end opposite the first end. The plurality of gears is configured to selectively allow the main shaft to drive the counter shaft in a forward direction. The plurality of gears is positioned substantially within the transmission case. The reverse drive assembly includes a first drive member configured to be coupled to the opposite end of the main shaft and a second drive member configured to be coupled to the second end of the counter shaft. The first drive member is drivingly coupled (e.g., by a chain, belt, shaft, or gear train) to the second drive member for rotation therewith. The reverse drive assembly also includes an engagement member operatively positioned between the second drive member and the counter shaft. The engagement member is movable between a first position out of engagement with the second drive member and the counter shaft, and a second position in engagement between the second drive member and the counter shaft to drive the counter shaft in a reverse direction. In some constructions, the engagement member is operatively positioned between the first drive member and the main shaft. In such constructions, the engagement member is movable between a first position out of engagement with the first drive member and the main shaft, and a second position in engagement between the first drive member and the main shaft to drive the counter shaft in a reverse direction.

In another aspect, the present invention provides a method of converting a transmission assembly of a motorcycle to include a reverse drive assembly. The transmission assembly includes a transmission case, a main shaft rotatably coupled to the transmission case, a counter shaft rotatably coupled to the transmission case, and a plurality of gears coupled to at least one of the main shaft and the counter shaft. The main shaft has an input end and an opposite end. The input end is configured to be rotatably driven. The counter shaft has a first end adjacent to the input end of the main shaft and a second end opposite the first end. The plurality of gears is configured to selectively allow the main shaft to drive the counter shaft in a forward direction. The plurality of gears is positioned substantially within the transmission case. The method includes providing a first drive member, a carrier shaft, a second drive member, and an engagement member. The method also includes coupling the first drive member to the opposite end of the main shaft, coupling the carrier shaft to the second end of the counter shaft, and supporting the second drive member with the carrier shaft. The method further includes movably coupling the engagement member to one of the main shaft adjacent to the first drive member and the counter shaft adjacent to the second drive member to drive the counter shaft in a reverse direction.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
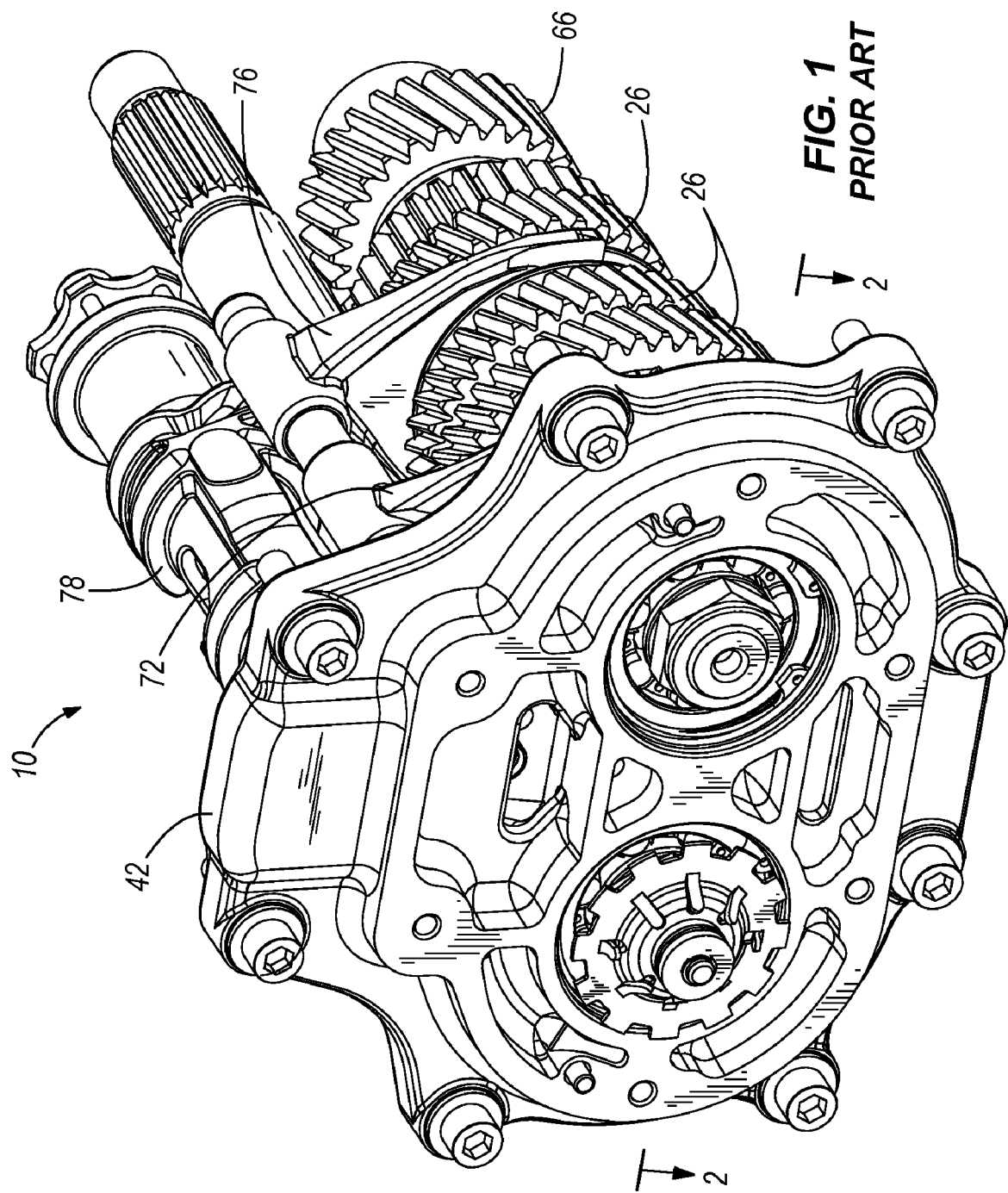
FIG. 1 is a perspective view of a transmission assembly of the prior art.
Figure 2:
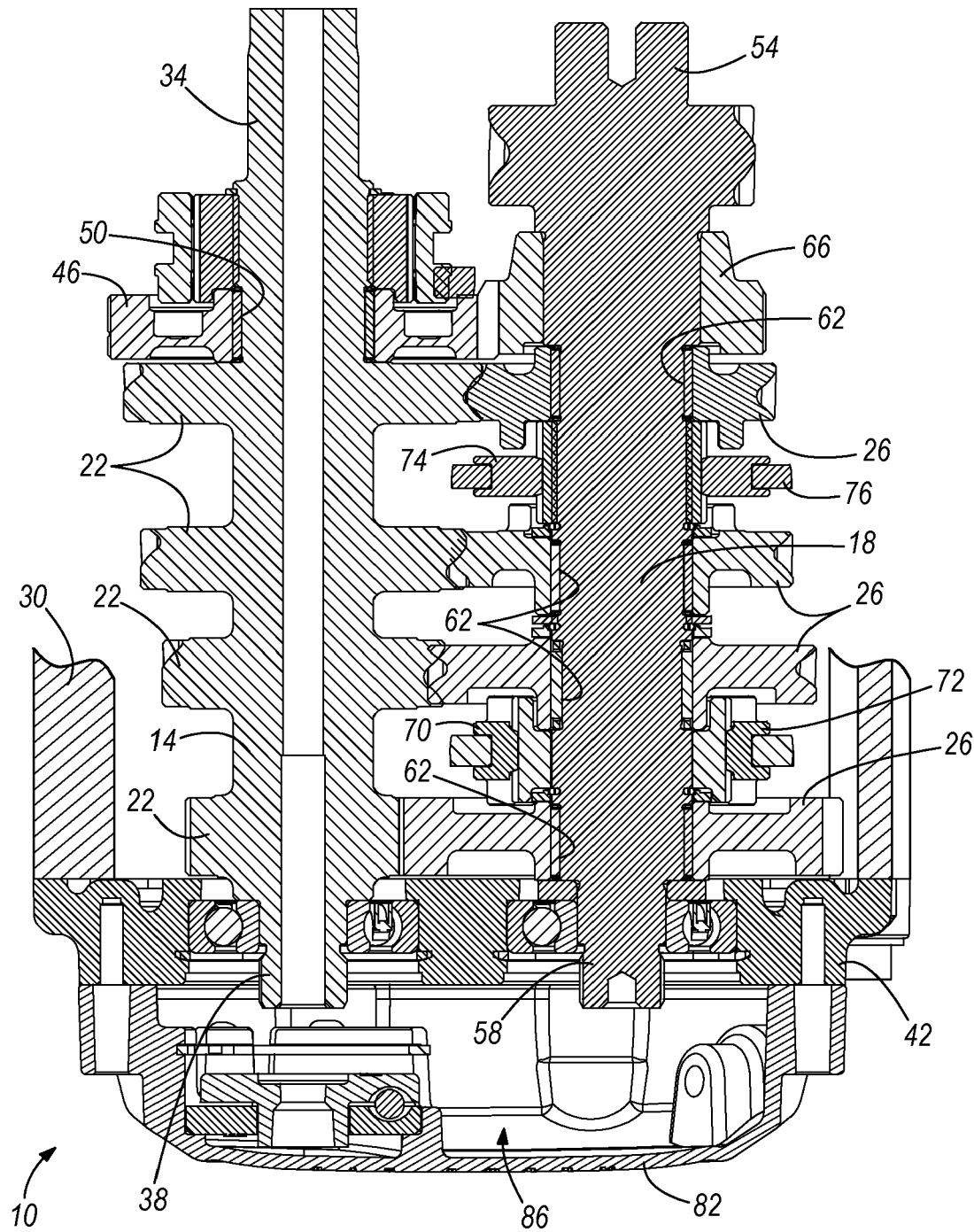
FIG. 2 is a cross-sectional view of the transmission assembly taken along line 2-2 in FIG. 1 with a side cover.
Figure 3:
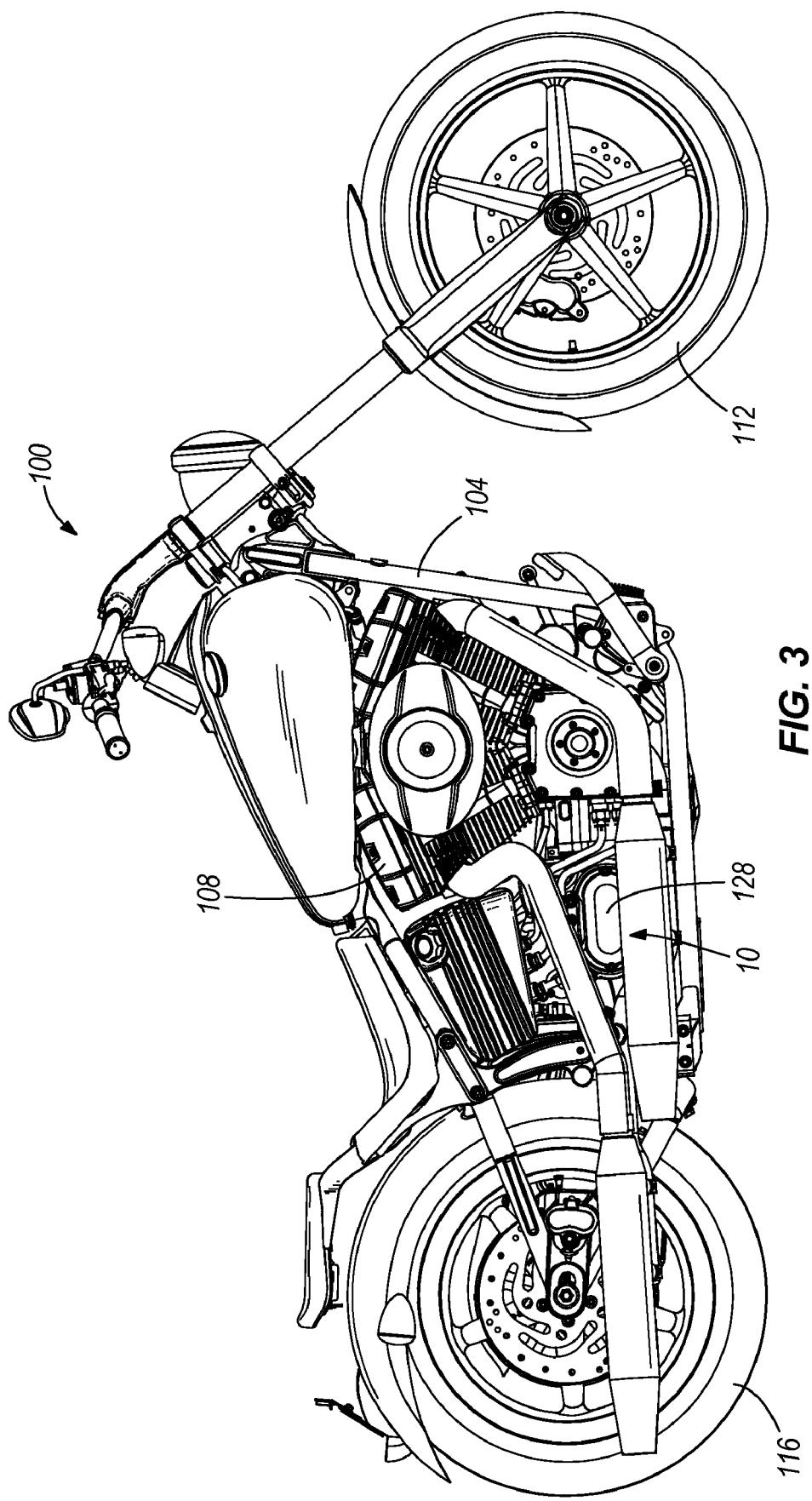
FIG. 3 is a side view of a motorcycle embodying the present invention.

FIG. 3 illustrates a motorcycle 100 including a frame 104, an engine 108 supported by the frame 104, a front wheel 112 rotatably coupled to the frame 104, and a rear wheel 116 rotatably coupled to the frame 104. In the illustrated embodiment, the rear wheel 116 is driven by the engine 108 through a transmission assembly 10 to propel the motorcycle 100 in a forward direction. Reference is hereby made to the description of the transmission assembly 10 above with respect to FIGS. 1 and 2 for discussion of the components and operation of the transmission assembly 10. The illustrated motorcycle 100 also includes a reverse drive assembly 120 (FIGS. 4-11) coupled to the transmission assembly 10. The rear wheel 116 is driven by the engine 108 through the reverse drive assembly 120 to propel the motorcycle 100 in a reverse direction.

Figure 4:
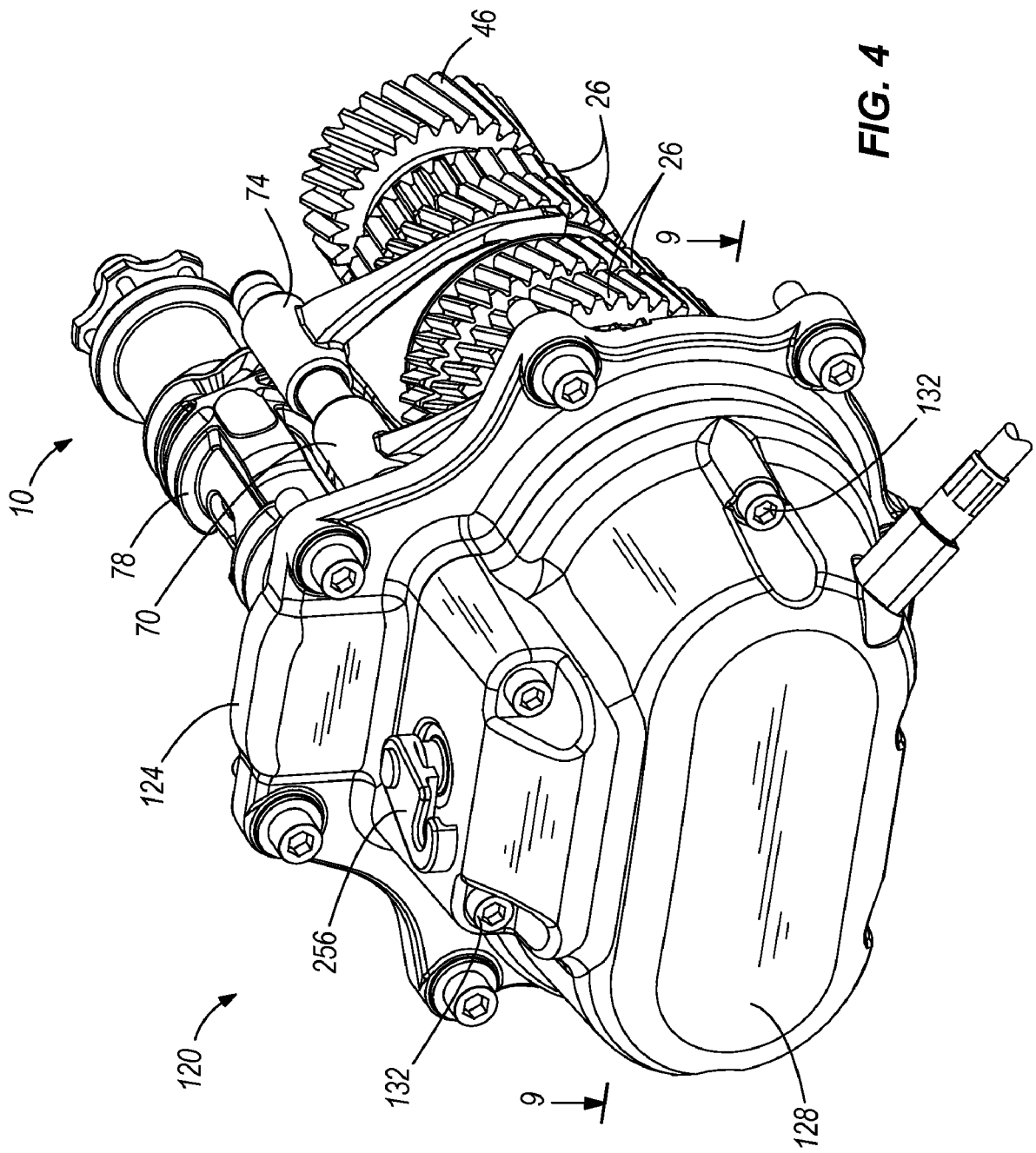
FIG. 4 is a front perspective view of a portion of a transmission assembly and a reverse drive assembly for use with the motorcycle shown in FIG. 3.

As shown in FIG. 4, the reverse drive assembly 120 includes a modified support plate 124 and a modified side cover 128, or access door, coupled to the support plate 124 to facilitate coupling of the reverse drive assembly 120 to the transmission assembly 10. In the illustrated embodiment, the modified side cover 128 is secured to the modified support plate 124 by fasteners 132 (e.g., bolts), although other suitable coupling means may also be employed. The modified side cover 128 protects the reverse drive assembly 120 and the transmission assembly 10, but is deeper than the unmodified side cover 82 (FIG. 2) to provide additional clearance and coverage for the reverse drive assembly 120. In addition, the modified support plate 124 includes additional bores and apertures compared to the unmodified support plate 42 (FIG. 2) to accommodate extra components of the reverse drive assembly 120.

Referring to FIG. 5-11, the illustrated reverse drive assembly 120 includes a first drive member 136, a carrier shaft 140, a second drive member 144, an engagement member 148, a first chain 152, and a second chain 156. The first drive member 136, or first sprocket, is coupled to the opposite end 38 of the main shaft 14 to rotate with the main shaft 14. In the illustrated embodiment, a hollow bolt 160 secures the first drive member 136 to the main shaft 14. In other embodiments, the first drive member 136 may be splined, press fit, and/or threaded onto the opposite end 38 of the main shaft 14. Additionally or alternatively, the opposite end 38 may be irregularly shaped (e.g., D-shaped) to receive a corresponding irregular bore in the first drive member 136, inhibiting relative rotation between the main shaft 14 and the first drive member 136. The illustrated first drive member 136 includes two sets of radially outwardly extending teeth 164 corresponding to and configured to engage the first and second chains 152, 156.

Figure 9:
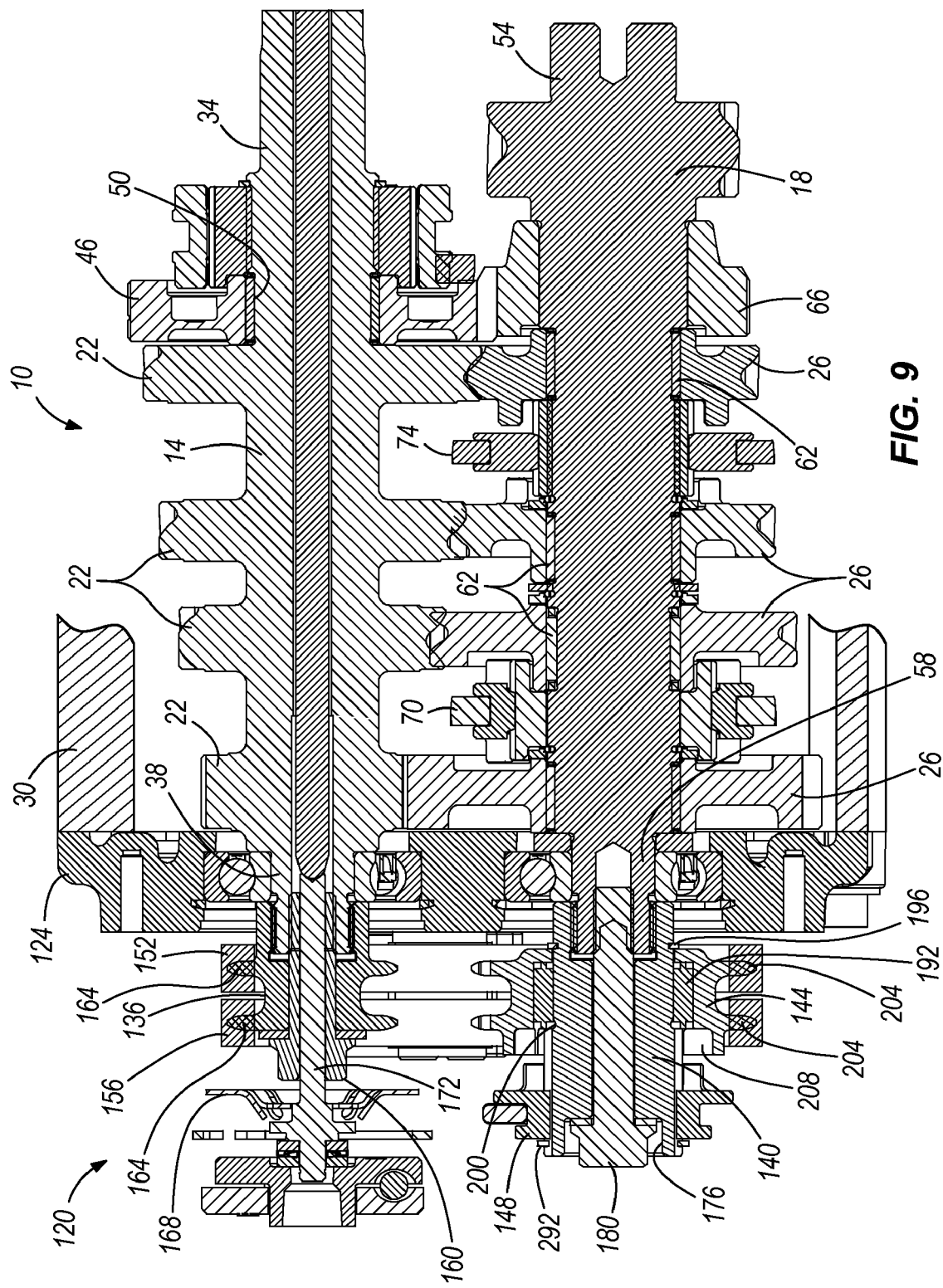
FIG. 9 is a cross-sectional view of the transmission assembly and the reverse drive assembly taken along line 9-9 in FIG. 4.
Figure 10:
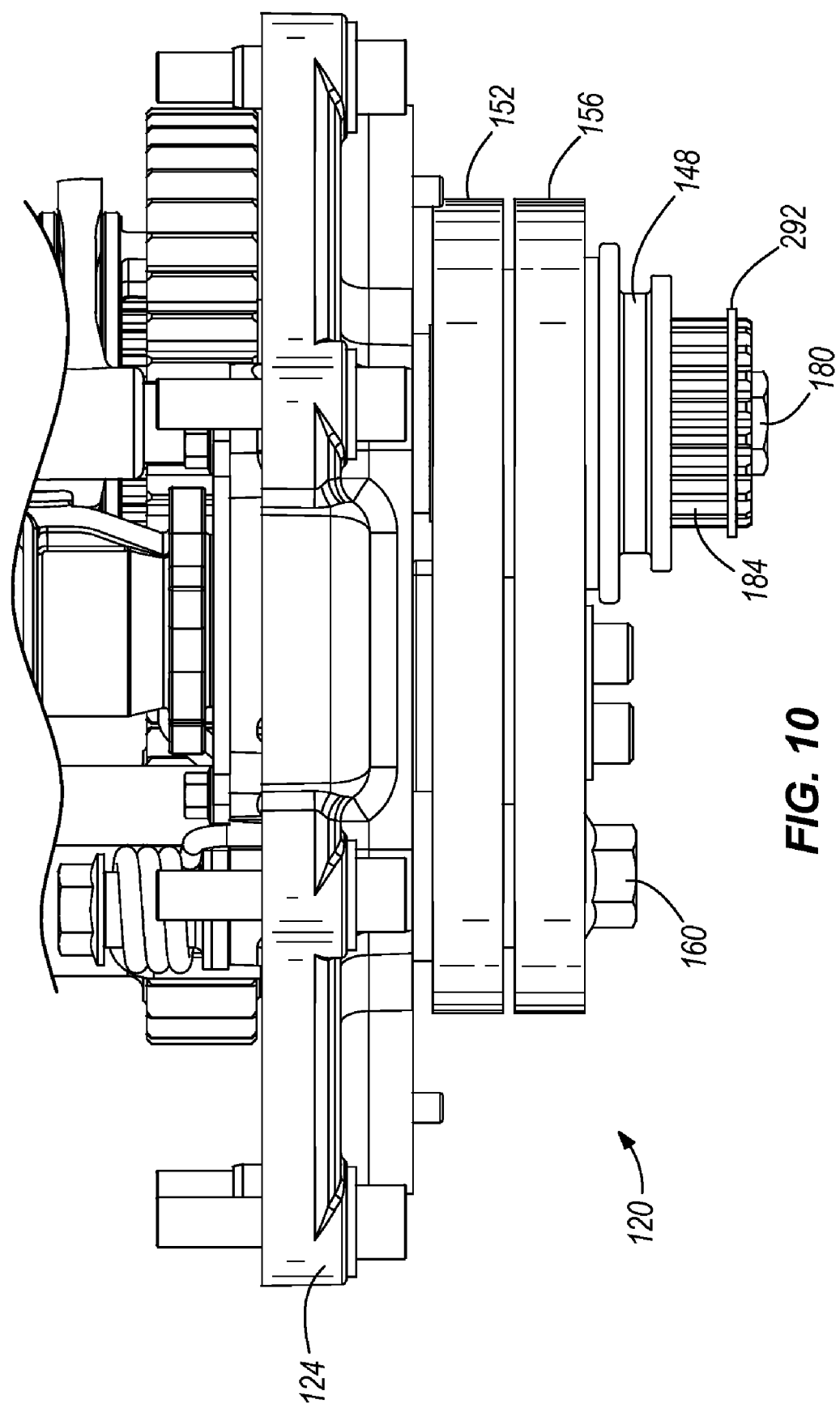
FIG. 10 is the top view of FIG. 8 in an engaged position.
Figure 11:
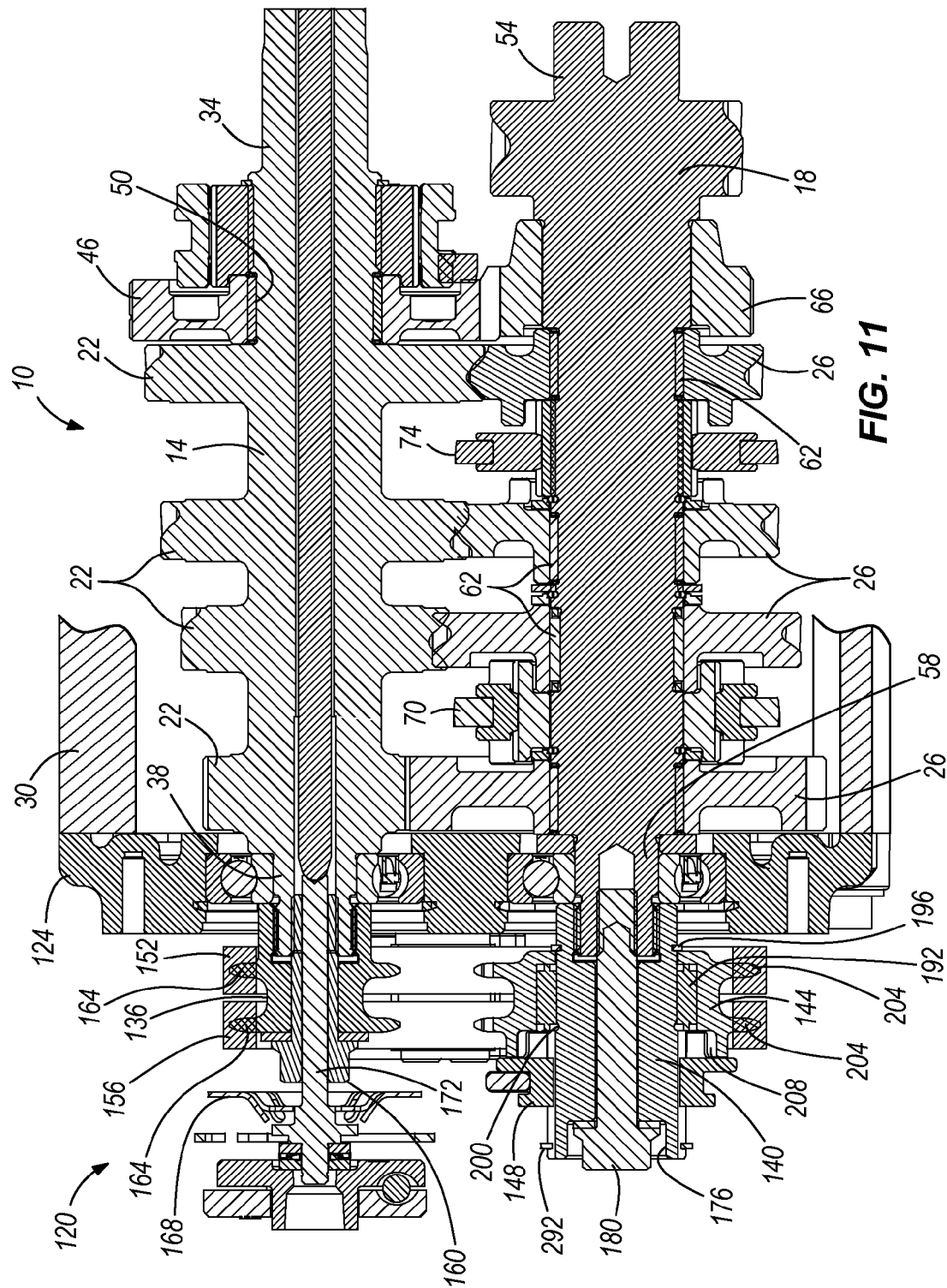
FIG. 11 is the cross-sectional view of FIG. 9 in the engaged position.

As shown in FIG. 9, an oil slinger 168 is coupled to the main shaft 14. The oil slinger 168 contacts oil within the side cover 128 and flings the oil onto the chains 152, 156 to lubricate the chains 152, 156. The illustrated oil slinger 168 includes an elongated post 172 extending through the hollow bolt 160 and the first drive member 136 to attach the oil slinger 168 to the main shaft 14. In some embodiments, the overall diameter of the oil slinger 168 may be reduced to avoid any clearance issues that may arise when the oil slinger 168 extends proximate to the side cover 128. In other embodiments, the side cover 128 may be configured such that the first and second chains 152, 156 contact the oil directly. In such embodiments, the oil slinger 168 may be omitted.

Figure 5:
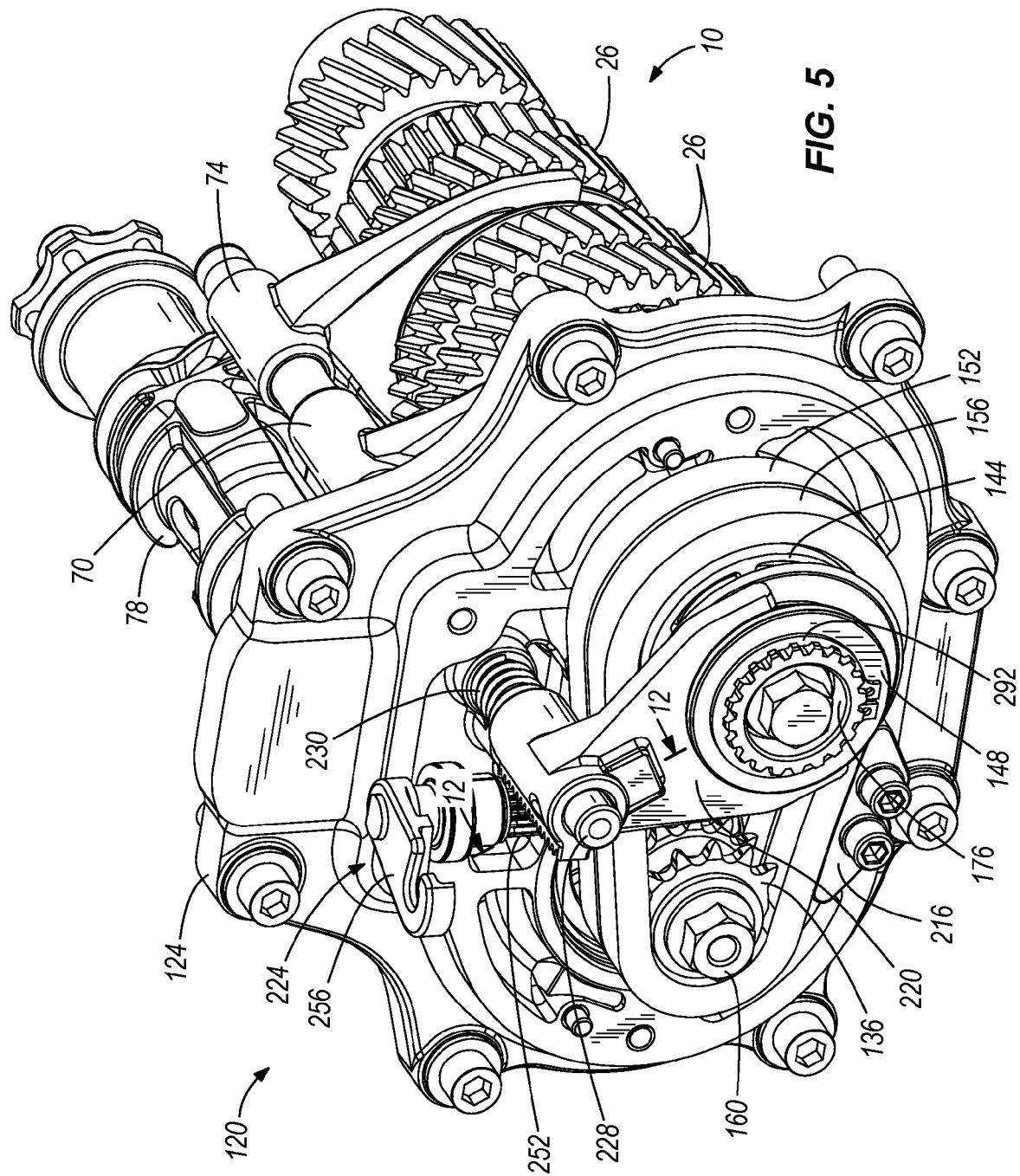
FIG. 5 is the perspective view of FIG. 4 without a side cover.
Figure 6:
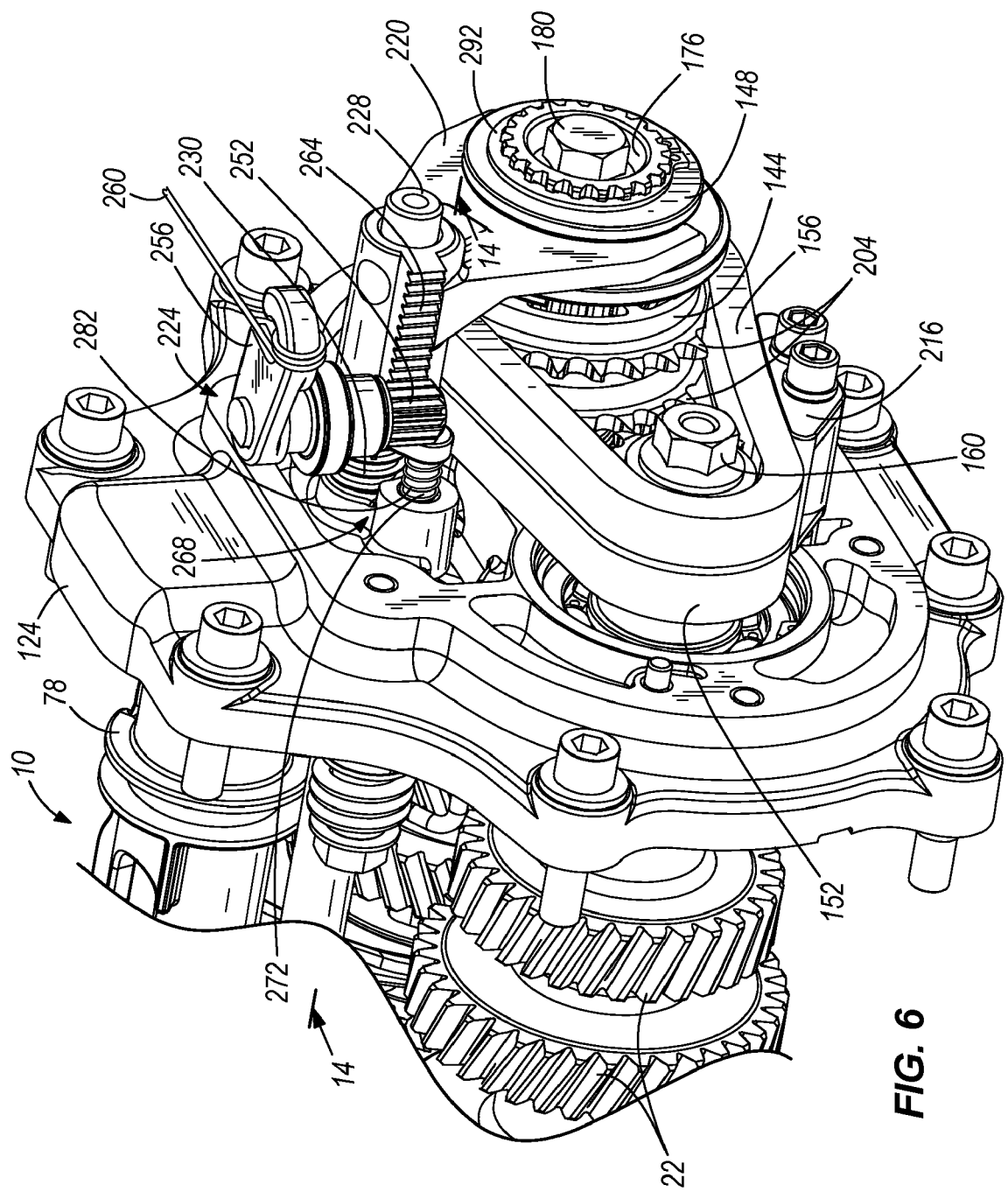
FIG. 6 is a rear perspective view of the transmission assembly and the reverse drive assembly shown in FIG. 5.
Figure 7:
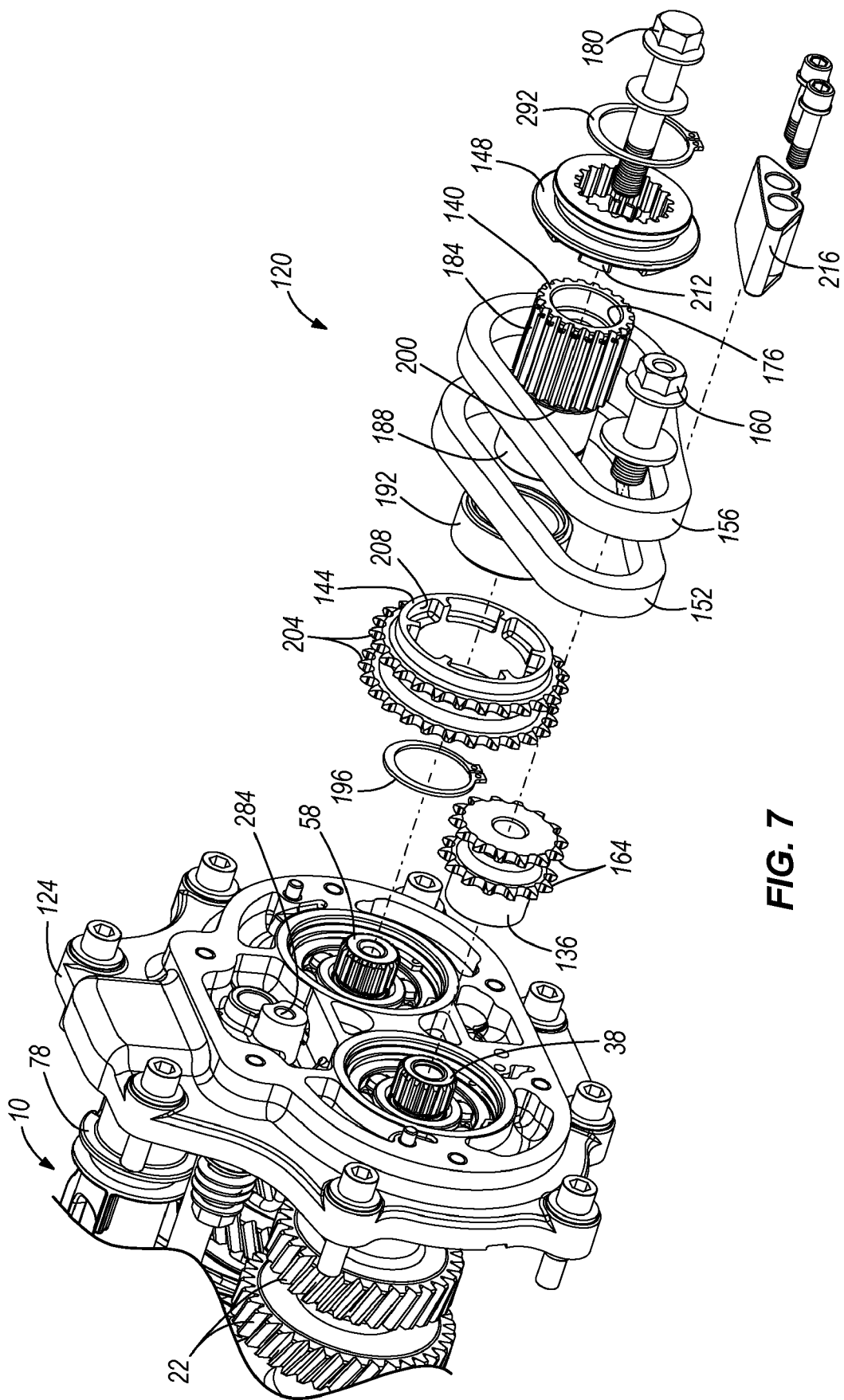
FIG. 7 is a partially exploded view of the transmission assembly and the reverse drive assembly shown in FIG. 6.
Figure 8:
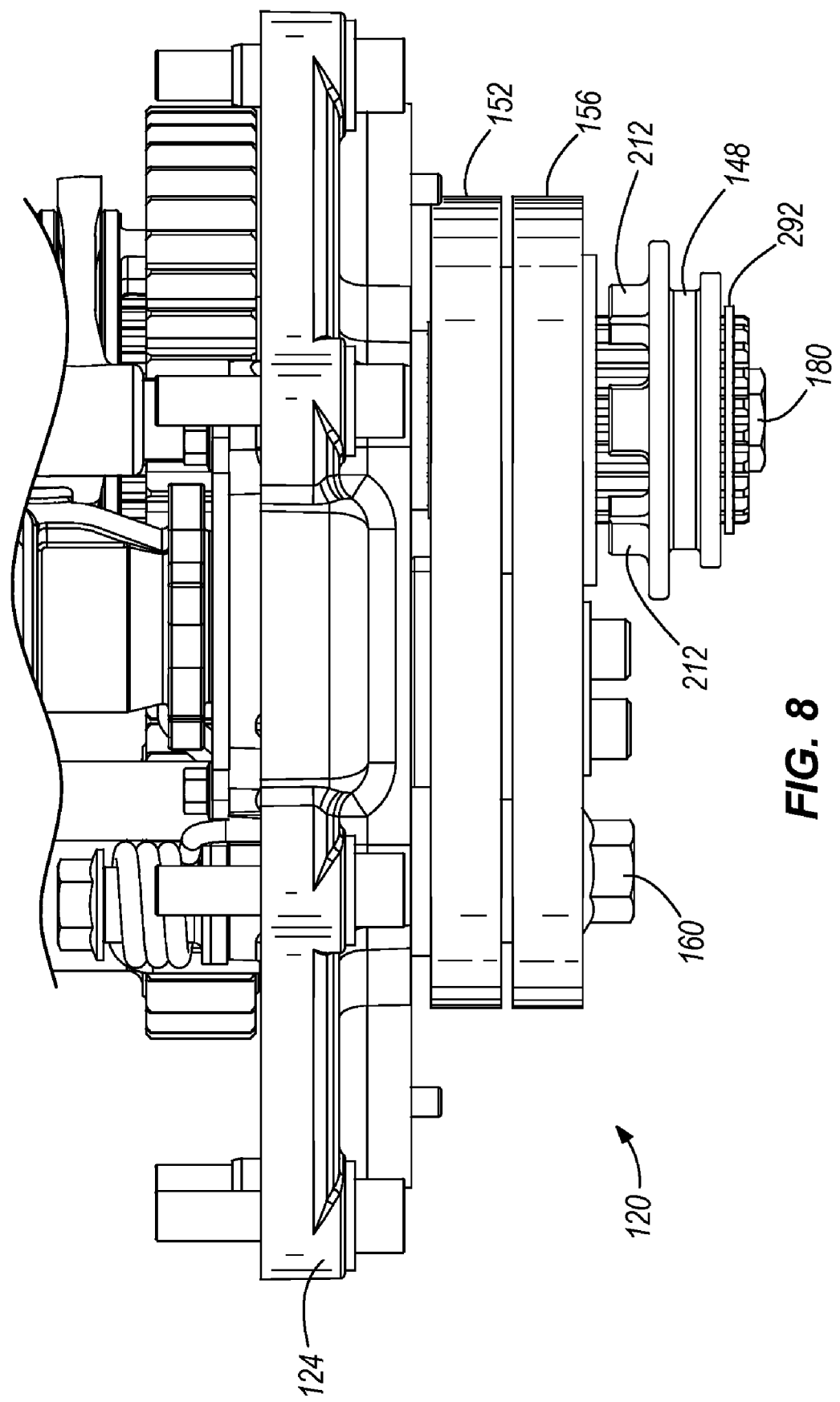
FIG. 8 is a top view of the transmission assembly and the reverse drive assembly shown in FIG. 6 in a disengaged position.

The illustrated carrier shaft 140 is coupled to the second end 58 of the counter shaft 18 to rotate with the counter shaft 18. In the illustrated embodiment, the carrier shaft 140 includes a recessed end 176 (FIGS. 5 and 6). The recessed end 176 receives a bolt 180 to securely fasten the carrier shaft 140 to the counter shaft 18, minimizing clearance issues for the bolt 180. Similar to the first drive member 136, in some embodiments, the carrier shaft 140 may be splined, press fit, threaded, and/or irregularly shaped to inhibit relative rotation between the counter shaft 18 and the carrier shaft 140. As shown in FIG. 7, the outer surface of the carrier shaft 140 includes a splined portion 184 and a non-splined portion 188.

The second drive member 144, or second sprocket, surrounds and is supported by the non-splined portion 188 of the carrier shaft 140. As shown in FIG. 9, a bearing 192 (e.g., a needle bearing) is positioned between the second drive member 144 and the carrier shaft 140 to allow the second drive member 144 to rotate relative to the carrier shaft 140. The second drive member 144 and the bearing 192 are held from longitudinal sliding movement along the carrier shaft 140 by a snap ring 196 and a shoulder 200 (FIGS. 7 and 9) formed on the carrier shaft 140 between the splined and non-splined portions 184, 188. The illustrated second drive member 144 includes two sets of radially outwardly extending teeth 204 corresponding to and configured to engage the first and second chains 152, 156. In addition, the second drive member 144 includes a series of apertures 208 configured to receive projections 212 on the engagement member 148 to rotate the engagement member 148 with the second drive member 144, as described below in more detail.

The engagement member 148, or dog ring, is movably (e.g., slidably) coupled to the carrier shaft 140 on the splined portion 184 of the carrier shaft 140. An interior surface of the engagement member 148 includes splines such that the engagement member 148 rotates with the carrier shaft 140 and also axially slides relative to the carrier shaft 140. The illustrated engagement member 148 includes the projections 212 that correspond to the apertures 208 in the second drive member 144. As the engagement member 148 slides toward the second drive member 144, the projections 212 enter and engage the apertures 208, causing the engagement member 148, the carrier shaft 140, and the counter shaft 18 to rotate with the second drive member 144. In some embodiments, the engagement member 148 may be slidably coupled to the main shaft 14 to selectively engage the first drive member 136. In such embodiments, the first drive member 136 may rotate relative to the main shaft 14 and the second drive member 144 may constantly rotate with the counter shaft 18.

The first and second chains 152, 156 extend around and engage the outwardly extending teeth 164, 204 of the first and second drive members 136, 144 to couple the first drive member 136 and the second drive member 144. That is, the chains 152, 156 are operable to transmit rotation from the first drive member 136 to the second drive member 144. In some embodiments (FIGS. 16 and 17), the reverse drive assembly 120 may only include a single chain that couples the first and second drive members 136, 144. In another embodiment, the first and second drive members 136, 144 may be pulleys. In such an embodiment, the first and second chains 152, 156 may be replaced by belts that extend around and engage the pulleys to transmit rotation from the first pulley to the second pulley.

A tensioner 216 is positioned adjacent to the chains 152, 156 to ensure the chains 152, 156 remain substantially taut during operation of the reverse drive assembly 120. In addition, the tensioner 216 may help reduce noise when the chains 152, 156 are rotating. In the illustrated embodiment, the tensioner 216 is composed of a polymeric material. In some embodiments, the tensioner 216 may be omitted or removed.

Referring to FIGS. 5 and 6, the reverse drive assembly 120 also includes an actuator 224 having a shifter fork 220 operable to activate the reverse drive assembly 120. The shifter fork 220 couples to the engagement member 148 and moves the engagement member 148 between a disengaged position (FIGS. 8 and 9), where the projections 212 of the engagement member 148 are spaced apart from the apertures 208 of the second drive member 144, and an engaged position (FIGS. 10 and 11), where the projections 212 engage the apertures 208.

Figure 12:
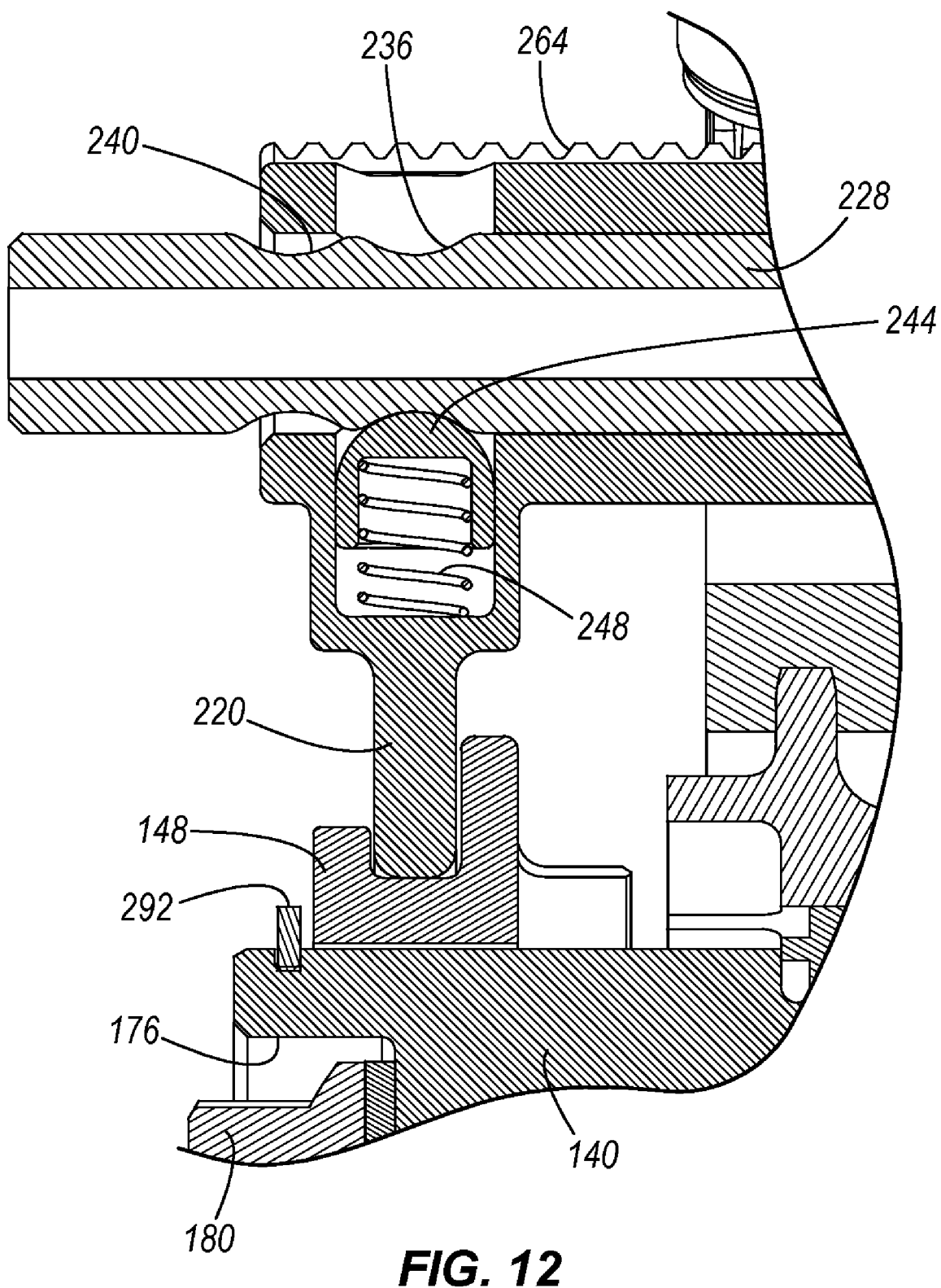
FIG. 12 is a cross-sectional view of a detent assembly take along line 12-12 of FIG. 5.

In the illustrated embodiment, a rail 228 extends from the support plate 124 to support the shifter fork 220 for movement thereon. As shown in FIGS. 5 and 6, a spring 230 is supported on the rail 228 between the support plate 124 and the shifter fork 220 to bias the shifter fork 220 to the disengaged position. Referring to FIG. 12, the rail 228 includes a detent assembly 232 to facilitate holding and alignment of the shifter fork 220 in the disengaged and engaged positions. The detent assembly 232 includes a first detent 236 in the form of an annular groove corresponding to the disengaged position, a second detent 240 in the form of an annular groove corresponding to the engaged position, and a spring-loaded plunger 244. The plunger 244 is coupled to the shifter fork 220 and is biased into the detents 236, 240 by a spring 248. The detents 236, 240 provide mechanical stops for the plunger 244 to properly align the shifter fork 220 at the disengaged position and the engaged position. When an adequate force is applied to the shifter fork 220, the plunger 244 slides out of the detents 236, 240 against the bias of the spring 248.

As shown in FIGS. 5 and 6, the shifter fork 220 is coupled to rail 228 such that when the actuator 224 is actuated (e.g., rotated), the shifter fork 220 moves between the disengaged and engaged positions. The illustrated actuator 224 also includes a pinion gear 252, a lever 256, and a cable 260. Referring to FIG. 6, a rack 264 is formed on the shifter fork 220 that couples to the pinion gear 252 of the actuator 224. The pinion gear 252 intermeshes with the rack 264 such that rotation of the pinion gear 252 slides the shifter fork 220 and the engagement member 148 between the disengaged and engaged positions. In the illustrated embodiment, the lever 256 is coupled to the pinion gear 252 to rotate the pinion gear 252. The cable 260 is coupled to the lever 256 such that tensioning (e.g., pulling) the cable 260 rotates the lever 256 and moves the shifter fork 220 with this rack-and-pinion mechanism. In other embodiments (FIGS. 16 and 17), the lever 256 may move the shifter fork 220 with a cam-and-groove mechanism.

In the illustrated embodiment, the cable 260 is coupled to a solenoid that pulls the cable 260. The solenoid is electrically coupled to a reverse switch on the handlebars or dashboard of the motorcycle 100. When a user flips, presses, or rotates the reverse switch, the solenoid pulls the cable 260, rotating the lever 256. In some embodiments, the solenoid may be a dual-action solenoid operable to move the lever 256 from the disengaged position to the engaged position, and from the engaged position back to the disengaged position. In other embodiments, the solenoid may be coupled directly to the lever 256 and the cable 260 may be omitted.

Figure 13:
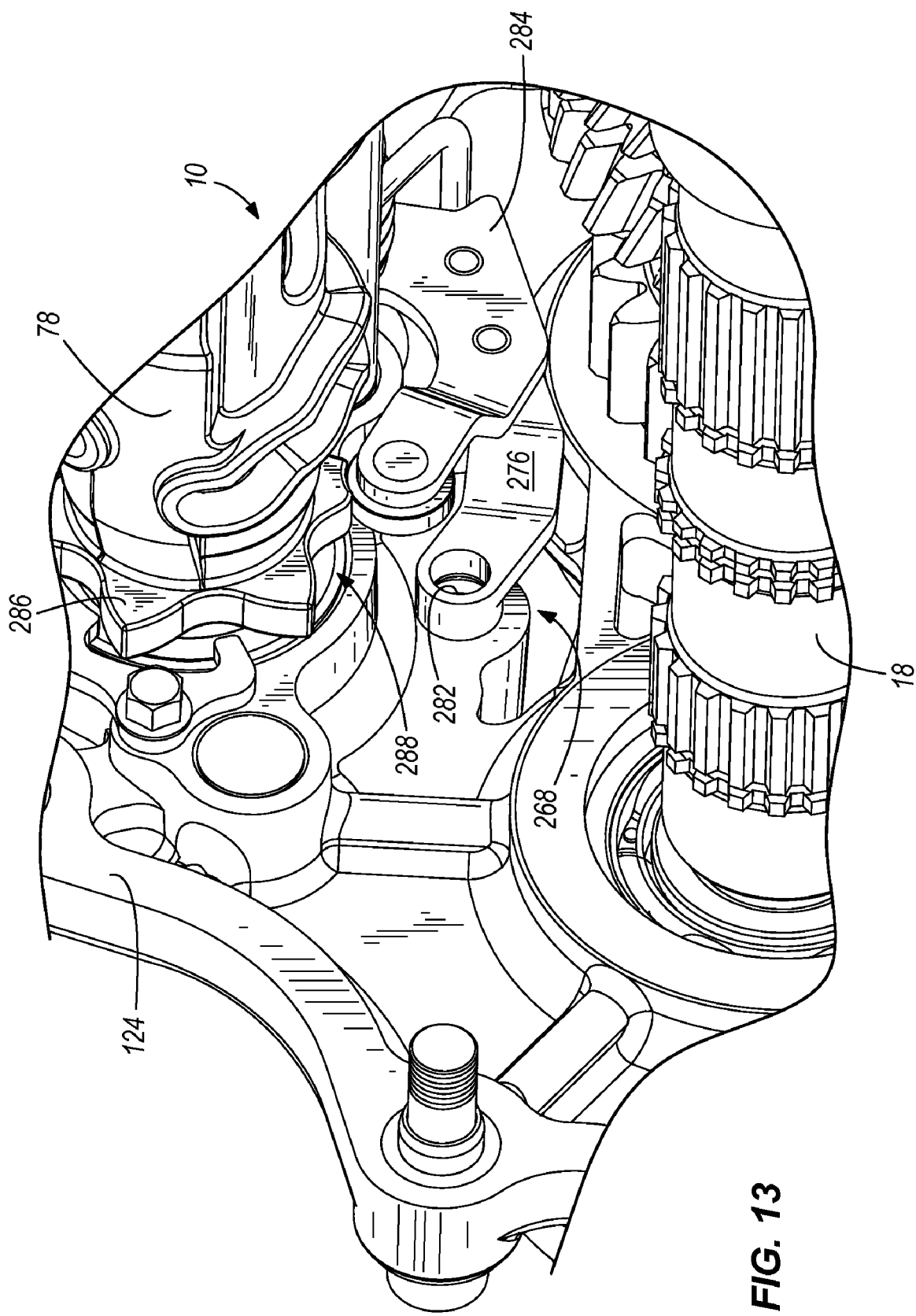
FIG. 13 is a perspective view of an interlock mechanism of the reverse drive assembly.
Figure 14:
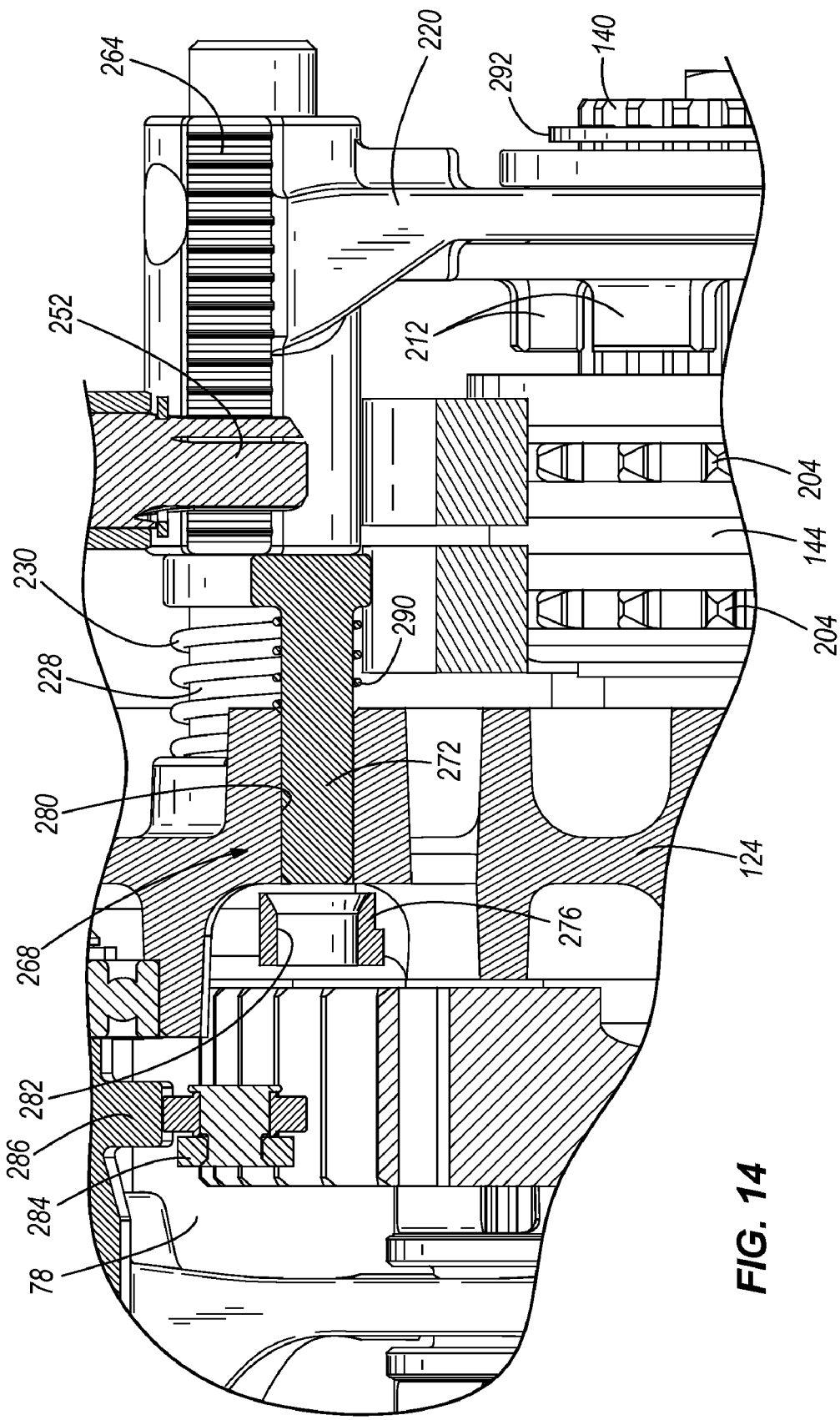
FIG. 14 is a cross-sectional view of the interlock mechanism taken along line 14-14 of FIG. 7 in a disengaged position.
Figure 15:
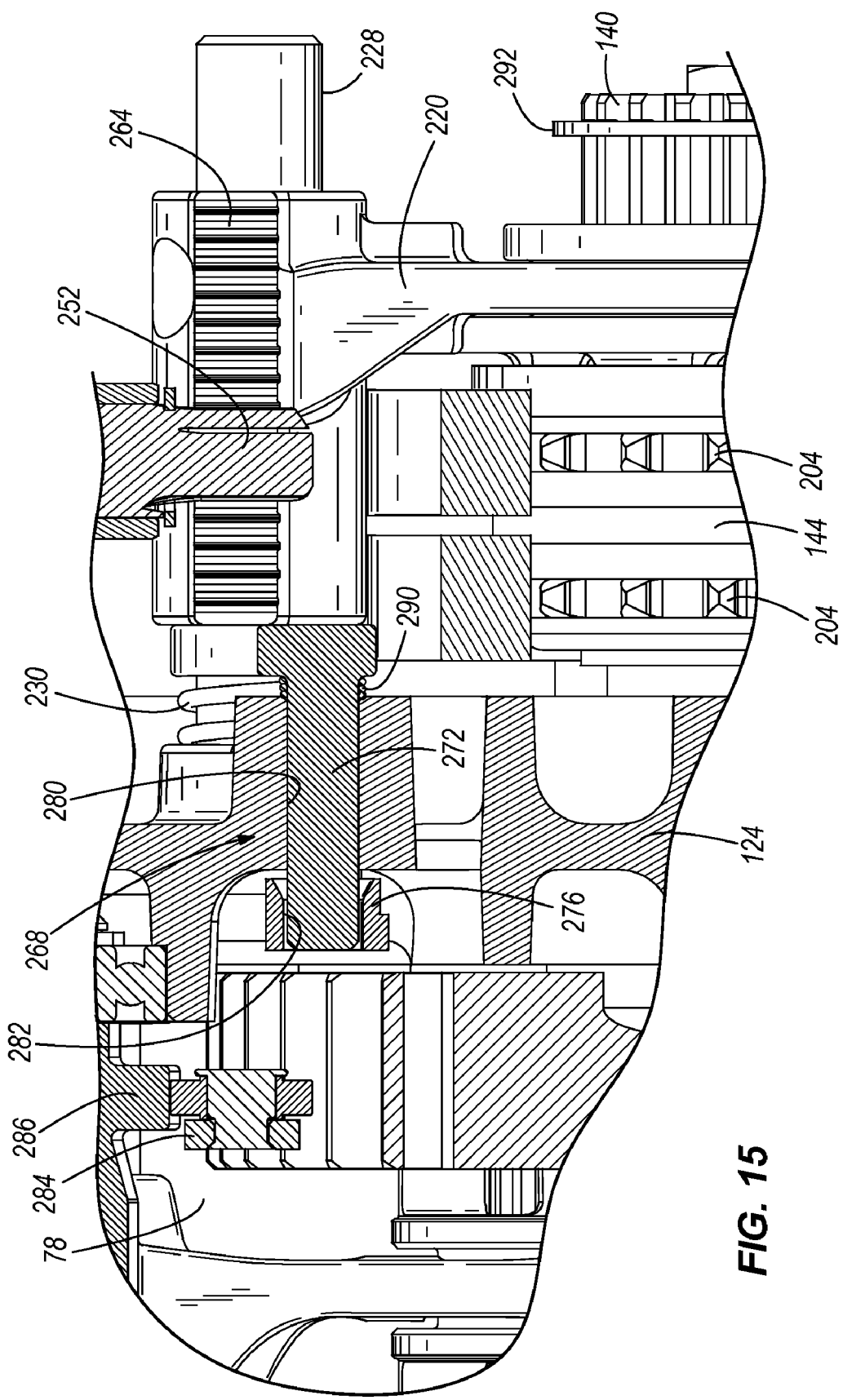
FIG. 15 is the cross-sectional view of FIG. 14 in an engaged position.

Referring to FIGS. 13-15, the reverse drive assembly 120 also includes an interlock, or lock-out, mechanism 268. The illustrated interlock mechanism 268 includes a pin 272 coupled to the shifter fork 220 and an arm 276 having an aperture 282. The pin 272 is supported within a bore 280 of the support plate 124 and is operable to move with the shifter fork 220 between a disengaged position (FIG. 14) and an engaged position (FIG. 15). A spring 290 surrounds a portion of the pin 272 to bias the pin 272 toward the disengaged position. The arm 276 is connected to a follower arm 284 that rides along a surface of a detent ring 286 of a shifter detent assembly 288. As the shifter drum 78 and the detent ring 286 rotate, the follower arm 284 moves generally up and down, following the surface of the detent ring 286. The arm 276 moves with the follower arm 284 and aligns with the bore 280 when the shifter drum 78 is in neutral and the follower arm 284 is in a neutral-resting position, as shown in FIG. 13. When the follower arm 284 is in the neutral-resting position and the shifter fork 220 moves to the engaged position, the pin 272 slides into the aperture 282 in the arm 276, holding the arm 276 in place. The arm 276 locks-out the shifter detent assembly 288 by inhibiting the up-and-down movement of the follower arm 284 such that the follower arm 284 cannot move from the neutral-resting position. In such a condition, the detent ring 286, and thereby the shifter drum 78, can no longer rotate, preventing engagement of the forward-driving gears 22, 26.

To activate the reverse drive assembly 120, a user turns an ignition of the motorcycle 100 to start the engine 108. As the engine 108 idles, the user shifts the transmission into neutral and engages and holds in a clutch of the motorcycle 100. While holding the clutch, the user flips the reverse switch on the dashboard, actuating the solenoid. The solenoid turns the lever 256, moving the engagement member 148 from the disengaged position (FIG. 9) to the engaged position (FIG. 10), thereby engaging the reverse drive assembly 120. In some embodiments, the solenoid may include an electrical interlock that inhibits the solenoid from turning the lever 256 unless the engine 108 is in neutral. Additionally or alternatively, actuating the reverse switch may turn on a light on the dashboard, indicating to the user that the reverse drive assembly 120 is engaged.

When the solenoid rotates the lever 256, the shifter fork 220 slides the engagement member 148 along the carrier shaft 140 such that the projections 212 on the engagement member 148 engage the apertures 208 in the second drive member 144. In addition, the pin 272 of the interlock mechanism 268 slides into the aperture 284 in the arm 276 to inhibit movement of the shifter drum 78. The second drive member 144 transmits the rotation from the first drive member 136 to the engagement member 148, which transmits the rotation to the carrier shaft 140 and the counter shaft 18. When the second drive member 144 and the engagement member 144 rotate the carrier shaft 140, the counter shaft 18 is rotated in an opposite, or reverse, direction than if the forward-driving gears 22, 26 were rotating the counter shaft 18. As such, the countershaft 18 rotates the output gear 66 in the opposite direction, which rotates the output gear 46 on the main shaft 14 in the opposite direction. The output gear 46 rotates the rear wheel 116 in reverse such that, as the user eases out the clutch and feathers in a throttle, the motorcycle 100 is propelled in a reverse direction.

In reverse, the maximum revolutions of the engine 108 and speed of the motorcycle 100 may be restricted. In some embodiments, the reverse drive assembly 120 includes a fail-safe mode such that, should the motorcycle 100 sense an improper function in the transmission assembly 10 or the reverse drive assembly 120, the entire reverse drive assembly 120 reverts to the disengaged position.

To install the reverse drive assembly 120 on an existing transmission assembly (e.g., the transmission assembly 10 shown in FIGS. 1 and 2), the side cover 82 and the support plate 42 of the prior art transmission assembly 10 are removed. If present, an oil slinger is also removed. Then, the modified support plate 124 is positioned in place of the old support plate 42 and coupled to the transmission case 30 of the motorcycle 100. In the illustrated embodiment, the modified support plate 124 is bolted to the transmission case 30, although other suitable coupling means may also be employed.

Once the modified support plate 124 is installed, the first drive member 136 is coupled to the opposite end 38 of the main shaft 14 with the hollow bolt 160. The elongated post 172 of the oil slinger 168 is inserted through the hollow bolt 160 and coupled to rotate with the main shaft 14. The second drive member 148 and the bearing 192 are positioned about the non-splined portion 188 of the carrier shaft 140 and held in place with the snap ring 196. Then, the carrier shaft 140 is coupled to the second end 58 of the counter shaft 18 with the bolt 180.

The first and second chains 152, 156 are engaged with (e.g., wrapped around) the first and second drive members 136, 144. The engagement member 148 is slid onto the splined portion 184 of the carrier shaft 140 and held in place with a snap ring 292. Once the engagement member 148 is installed, the shifter fork 220 and the actuator 224 are coupled to the engagement member 148. The actuator 224 is then coupled to the cable 260 or directly to the solenoid, which is electrically coupled to the reverse switch. Although the preceding installation steps were discussed in a specific order, it should be readily apparent to one skilled in the art that the steps may be performed in a different order and/or some of the steps may be performed generally simultaneously with other steps.

Figure 16:
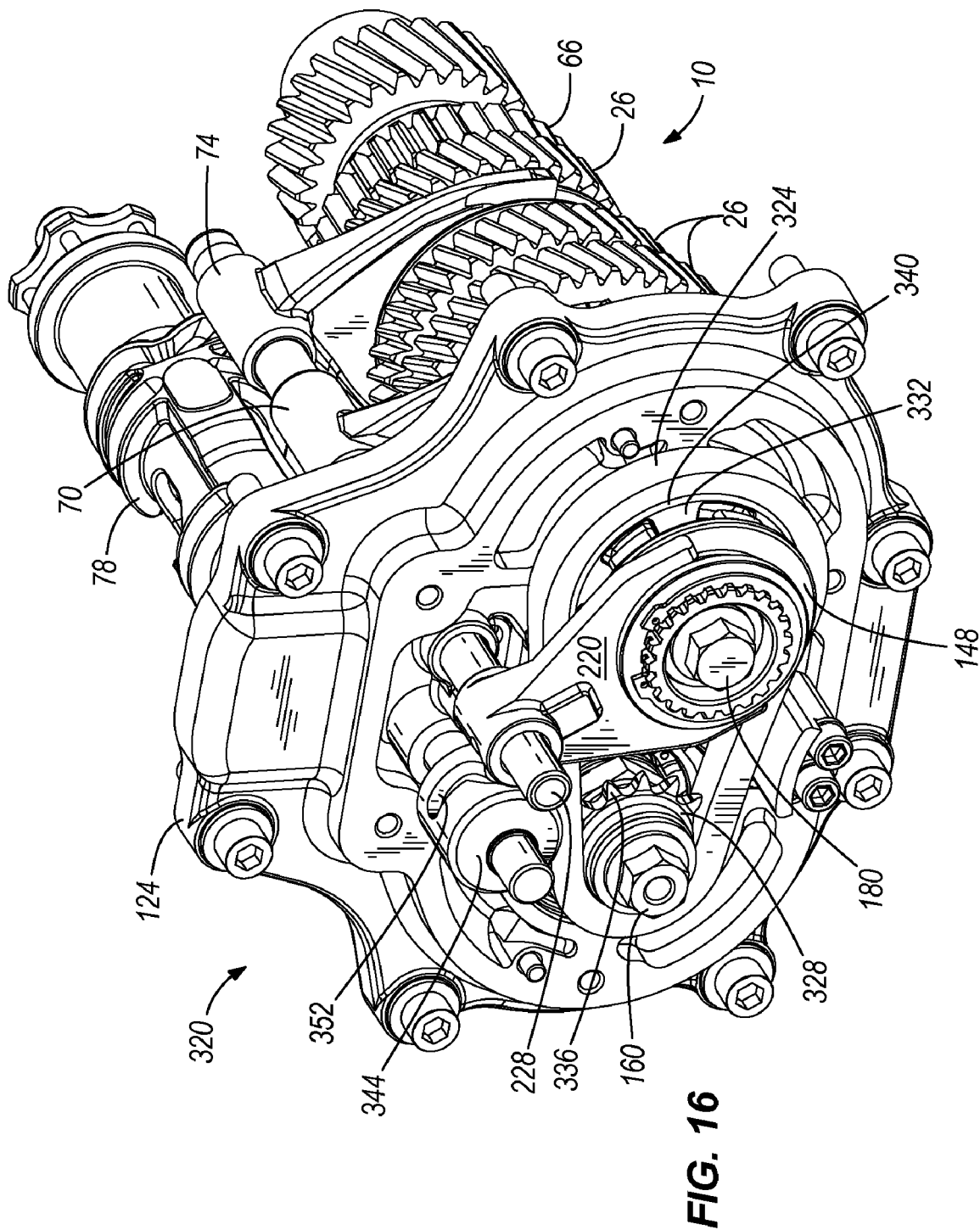
FIG. 16 is a perspective view of another reverse drive assembly for use with the motorcycle shown in FIG. 3.
Figure 17:
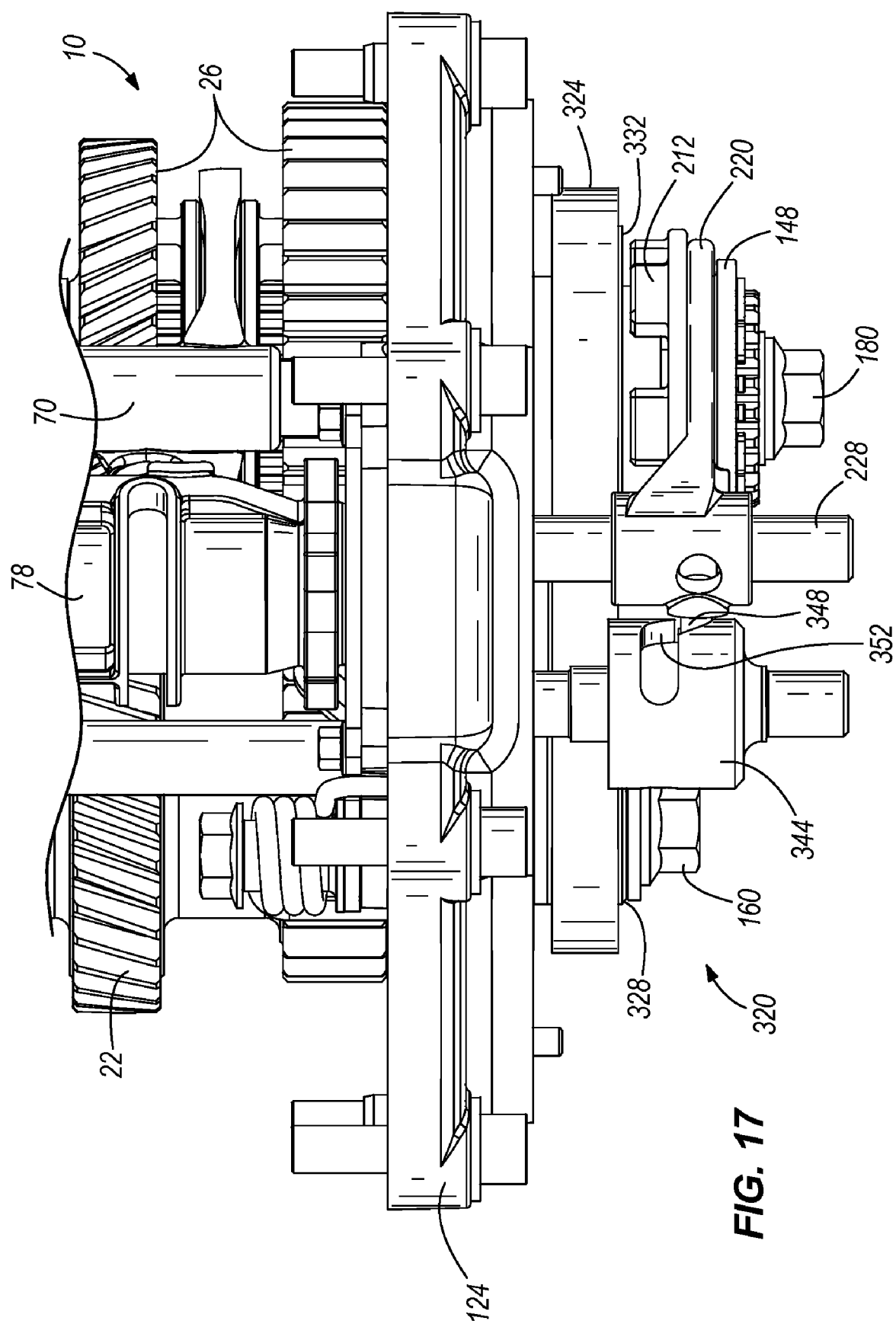
FIG. 17 is a top view of the transmission assembly and the reverse drive assembly shown in FIG. 16.

FIGS. 16 and 17 illustrate another construction of a reverse drive assembly 320. This reverse drive assembly 320 is similar to the reverse drive assembly 120 discussed above and like parts have been given the same reference numbers. Reference is hereby made to the description of the reverse drive assembly 120 above for discussion of various structures, functions, and alternatives of the reverse drive assembly 320 not specifically discussed herein.

The illustrated reverse drive assembly 320 includes a single chain 324 to drivingly couple a first drive member 328 to a second drive member 332. In the illustrated embodiment, the first and second drive members 328, 332 includes first and second sets of outwardly extending teeth 336, 340, respectively, that engage the chain 324. When the first drive member 328 rotates, the rotation is transmitted to the second drive member 328 through the single chain 324, rather than a pair of chains.

In the illustrated embodiment, an actuator 344 moves the shifter fork 220 with a cam-and-groove mechanism. The illustrated shifter fork 220 includes a cam post 348 and the illustrated actuator 344 includes a groove 352 configured to engage the cam post 348. As the actuator 344 is rotated (e.g., by the solenoid), the cam post 348 slides within the groove 352 to move the shifter fork 220 and the engagement member 148 between the disengaged and engaged positions.

Figure 18:
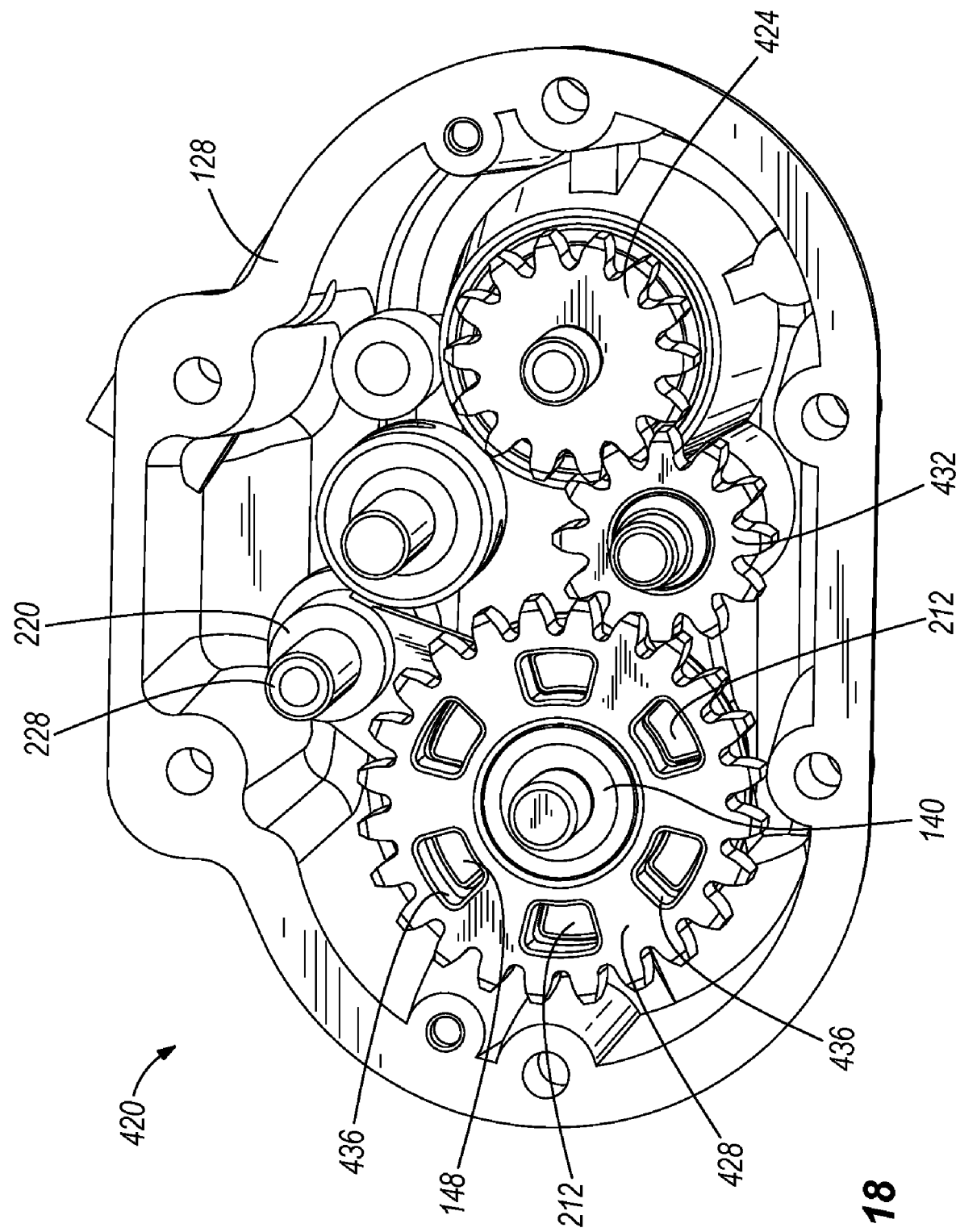
FIG. 18 is a rear view of a side cover of another reverse drive assembly for use with the motorcycle shown in FIG. 3.

FIG. 18 illustrates yet another construction of a reverse drive assembly 420. This reverse drive assembly 420 is similar to the reverse drive assemblies 120, 320 discussed above and like parts have been given the same reference numbers.

Reference is hereby made to the description of the reverse drive assemblies 120, 320 above for discussion of various structures, functions, and alternatives of the reverse drive assembly 420 not specifically discussed herein.

The illustrated reverse drive assembly 420 includes a first drive member 424, a second drive member 428, and a third drive member 432. In the illustrated embodiment, the drive members 424, 428, 432 are gears in constant intermeshing engagement with each other. The first drive member 424, or first gear, is coupled to the main shaft 14 to rotate with the main shaft 14. The second drive member 428, or second gear, is coupled to the counter shaft 18 through the carrier shaft 140. Similar to the previous embodiment, the second drive member 428 rotates relative to the carrier shaft 140 and the counter shaft 18. The third drive member 432, or third gear, is positioned between the first and second drive members 424, 428 to transmit rotation from the first drive member 424 to the second drive member 428. The third drive member 432 provides an extra gear between the main shaft 14 and the counter shaft 18 that causes the counter shaft 18 to rotate in an opposite direction than if the counter shaft 18 were rotated by the forward-driving gears 22, 26.

The engagement member 148 is coupled the carrier shaft 140 to slide between a disengaged position, where the projections 212 on the engagement member 148 are spaced apart from apertures 436 in the second drive member 428, and an engaged position, where the projections 212 engage the apertures 436. Similar to the previous embodiments, the shifter fork 220 is coupled to the engagement member 148 to slide the engagement member 148 between the disengaged and engaged positions.

In operation, the main shaft 14 rotates the first drive member 424, which rotates the third drive member 432, which rotates the second drive member 428. When the engagement member 148 is in the disengaged position, the projections 212 on the engagement member 148 are spaced apart from the apertures 436 in the second drive member 428 so that the second drive member 428 rotates relative to the carrier shaft 140. When the reverse switch is actuated, the engagement member 148 slides along the carrier shaft 140 to the engaged position such that the projections 212 engage the apertures 436. The second drive member 428 rotates the engagement member 148, thereby rotating the carrier shaft 140 and the counter shaft 18 in an opposite direction. When the counter shaft 18 rotates the output gear 66 in the opposite direction, the output gear 66 rotates the output gear 46 on the main shaft 14 in an opposite direction, propelling the motorcycle 100 in the reverse direction.

The reverse drive assemblies 120, 320, 420 provide compact drive assemblies capable of propelling motorcycles in a reverse direction. In addition, the reverse drive assemblies 120, 320, 420 maintain a substantially similar footprint to existing transmission assemblies such that the reverse drive assemblies may be easily installed as an after-market drive assembly on a variety of motorcycles. For example, the illustrated modified side cover 128 (FIG. 4) has substantially similar outer dimensions compared to the illustrated unmodified side cover 82 (FIG. 2), but the modified side cover 128 is deeper than the unmodified side cover 82. Furthermore, the reverse drive assemblies 120, 320, 420 are designed to couple to existing drive assemblies by bolts and, as such, do not require specialized tools or welding to couple the components together.

Although the reverse drive assemblies 120, 320, 420 were discussed with reference to a two-wheeled motorcycle, it should be readily apparent to one skilled in the art that the reverse drive assemblies 120, 320, 420 may also be configured for and installed on three-wheeled motorcycles, or trikes.

Various features and advantages of the invention are set forth in the following claims.

What is claimed is:

1. A reverse drive assembly for a motorcycle including a transmission assembly having a transmission case, a main shaft rotatably coupled to the transmission case, a counter shaft rotatably coupled to the transmission case, and a plurality of gears coupled to at least one of the main shaft and the counter shaft, the main shaft having an input end and an opposite end, the input end configured to be rotatably driven, the counter shaft having a first end adjacent to the input end of the main shaft and a second end opposite the first end, the opposite end of the main shaft and the second end of the counter shaft being supported for rotation by a support plate, the plurality of gears configured to selectively allow the main shaft to drive the counter shaft in a forward direction, the plurality of gears positioned substantially within the transmission case and to the inside of the support plate, the reverse drive assembly comprising:

a first drive member configured to be positioned to the outside of the support plate and coupled to the opposite end of the main shaft;

a second drive member configured to be positioned to the outside of the support plate and coupled to the second end of the counter shaft, the first drive member drivingly coupled to the second drive member for rotation therewith; and an engagement member operatively positioned between one of the first drive member and the main shaft and the second drive member and the counter shaft, the engagement member movable between a first position out of engagement with the one of the first drive member and the main shaft and the second drive member and the counter shaft, and a second position in engagement between the one of the first drive member and the main shaft and the second drive member and the counter shaft to drive the counter shaft in a reverse direction.

2. The reverse drive assembly of claim 1, wherein the transmission case includes a side opening defined between the support plate and a side cover of the transmission assembly, and wherein the opposite end of the main shaft and the second end of the counter shaft are positioned in the side opening and within the side cover, and wherein the first and second drive members and the engagement member are configured to be positioned in the side opening and substantially within the side cover.

3. The reverse drive assembly of claim 1, wherein the first drive member is a first sprocket and the second drive member is a second sprocket, and further comprising a chain engaging the first sprocket and the second sprocket to transmit rotation from the first sprocket to the second sprocket.

4. The reverse drive assembly of claim 3, further comprising a second chain engaging the first sprocket and the second sprocket to transmit rotation from the first sprocket to the second sprocket.

5. The reverse drive assembly of claim 1, wherein the first drive member is a first gear and the second drive member is a second gear, and further comprising a third gear engaging the first gear and the second gear to transmit rotation from the first gear to the second gear.

6. The reverse drive assembly of claim 1, further comprising a carrier shaft configured to be coupled to the second end of the counter shaft for rotation with the counter shaft, and wherein the carrier shaft supports the second drive member.

7. The reverse drive assembly of claim 6, wherein the engagement member is splined to the carrier shaft for rotation with the carrier shaft.

8. The reverse drive assembly of claim 1, further comprising a shifter fork coupled to the engagement member, and wherein the shifter fork moves the engagement member between the first position and the second position, the reverse drive assembly further comprising an actuator coupled to the shifter fork to facilitate movement of the shifter fork.

9. The reverse drive assembly of claim 1, wherein the transmission assembly includes a shifter drum rotatable to selectively engage different combinations of a plurality of gears, and further comprising a pin coupled for movement with the engagement member between the first position and the second position, and wherein moving the pin to the second position substantially inhibits rotation of the shifter drum.

10. A motorcycle comprising:
a transmission assembly including
a transmission case,
a main shaft rotatably coupled to the transmission case, the main shaft having an input end and an opposite end, the input end configured to be rotatably driven,
a counter shaft rotatably coupled to the transmission case, the counter shaft having a first end adjacent the input end of the main shaft and a second end opposite the first end,
a support plate supporting for rotation the opposite end of the main shaft and the second end of the counter shaft, and
a plurality of gears coupled to at least one of the main shaft and the counter shaft and positioned to the inside of the support plate, the plurality of gears configured to selectively allow the main shaft to drive the counter shaft in a forward direction, the plurality of gears positioned substantially within the transmission case; and
a reverse drive assembly including
a first drive member positioned to the outside of the support plate and coupled to the opposite end of the main shaft,
a second drive member positioned to the outside of the support plate and coupled to the second end of the counter shaft, the first drive member drivingly coupled to the second drive member for rotation therewith, and
an engagement member operatively positioned between one of the first drive member and the main shaft and the second drive member and the counter shaft, the engagement member movable between a first position out of engagement with the one of the first drive member and the main shaft and the second drive member and the counter shaft, and a second position in engagement between the one of the first drive member and the main shaft and the second drive member and the counter shaft to drive the counter shaft in a reverse direction.

11. The motorcycle of claim 10, wherein the transmission case includes a side opening defined between the support plate and a side cover of the transmission assembly, and wherein the opposite end of the main shaft, the second end of the counter shaft, the first and second drive members, and the engagement member are positioned in the side opening and substantially within the side cover.

12. The motorcycle of claim 10, wherein the first drive member is a first sprocket and the second drive member is a second sprocket, and wherein the reverse drive assembly further includes a chain engaging the first sprocket and the second sprocket to transmit rotation from the first sprocket to the second sprocket.

13. The motorcycle of claim 12, wherein the reverse drive assembly further includes a second chain engaging the first sprocket and the second sprocket to transmit rotation from the first sprocket to the second sprocket.

14. The motorcycle of claim 10, wherein the reverse drive assembly further includes a shifter fork coupled to the engagement member, and wherein the shifter fork moves the engagement member between the first position and the second position, and further wherein the reverse drive assembly includes an actuator coupled to the shifter fork to facilitate movement of the shifter fork.

15. The motorcycle of claim 10, wherein the transmission assembly includes a shifter drum rotatable to selectively engage different combinations of the plurality of gears, and wherein the reverse drive assembly further includes a pin coupled for movement with the engagement member between the first position and the second position, and wherein moving the pin to the second position substantially inhibits rotation of the shifter drum.

16. A method of converting a transmission assembly of a motorcycle to include a reverse drive assembly, the transmission assembly including a transmission case, a main shaft rotatably coupled to the transmission case, a counter shaft rotatably coupled to the transmission case, and a plurality of gears coupled to at least one of the main shaft and the counter shaft, the main shaft having an input end and an opposite end, the input end configured to be rotatably driven, the counter shaft having a first end adjacent to the input end of the main shaft and a second end opposite the first end, the opposite end of the main shaft and the second end of the counter shaft being supported for rotation by a support plate, the plurality of gears configured to selectively allow the main shaft to drive the counter shaft in a forward direction, the plurality of gears positioned substantially within the transmission case and to the inside of the support plate, the method comprising:
providing a first drive member, a second drive member, and an engagement member;
coupling the first drive member to the opposite end of the main shaft at a position to the outside of the support plate;
coupling the second drive member to the second end of the counter shaft at a position to the outside of the support plate; and
movably coupling the engagement member to one of the main shaft adjacent to the first drive member and the counter shaft adjacent to the second drive member to drive the counter shaft in a reverse direction.

17. The method of claim 16, further comprising providing a carrier shaft and coupling the carrier shaft to the second end of the counter shaft, and wherein coupling the second drive member to the second end of the counter shaft including supporting the second drive member with the carrier shaft.

18. The method of claim 16, further comprising covering a side opening of the transmission assembly with a side cover, and substantially positioning within the side cover the opposite end of the main shaft, the second end of the counter shaft, and the first and second drive members, and the engagement member.

* * * * *